United States Patent [19]

Howard

[11] 4,211,429
[45] Jul. 8, 1980

[54] ADJUSTABLE SUSPENSION ASSEMBLY

[76] Inventor: Durrell U. Howard, 306 Krameria Dr., San Antonio, Tex. 78205

[21] Appl. No.: 897,891

[22] Filed: Apr. 19, 1978

[51] Int. Cl.² .......................................... B60G 11/22
[52] U.S. Cl. .................................... 280/716; 267/35; 267/63 R
[58] Field of Search .................. 267/35, 63 R, 64 B; 280/716

[56] References Cited

U.S. PATENT DOCUMENTS

| | | | |
|---|---|---|---|
| 2,649,213 | 8/1953 | Withall | 267/35 |
| 2,678,796 | 5/1954 | Roy | 267/63 R |
| 2,749,114 | 6/1956 | Withall | 267/63 R |

FOREIGN PATENT DOCUMENTS 40124  7/1965  German Democratic Rep. ........ 267/35

*Primary Examiner*—John J. Love
*Assistant Examiner*—Ross Weaver
*Attorney, Agent, or Firm*—Pollock, Vande Sande & Priddy

[57] ABSTRACT

A novel, vehicular suspension system comprising an air-bag shock absorbing assembly acting in cooperation with a plurality of sequentially deformable elastomeric members. The air-bag carries a portion of the load and at least some of the elastomeric members carry the remainder of the load. Each elastomeric member is supported in a retaining member so arranged that, as the load on the suspension system is increased, additional ones of the elastomeric members are sequentially compressed and absorb more of the load.

28 Claims, 1 Drawing Figure

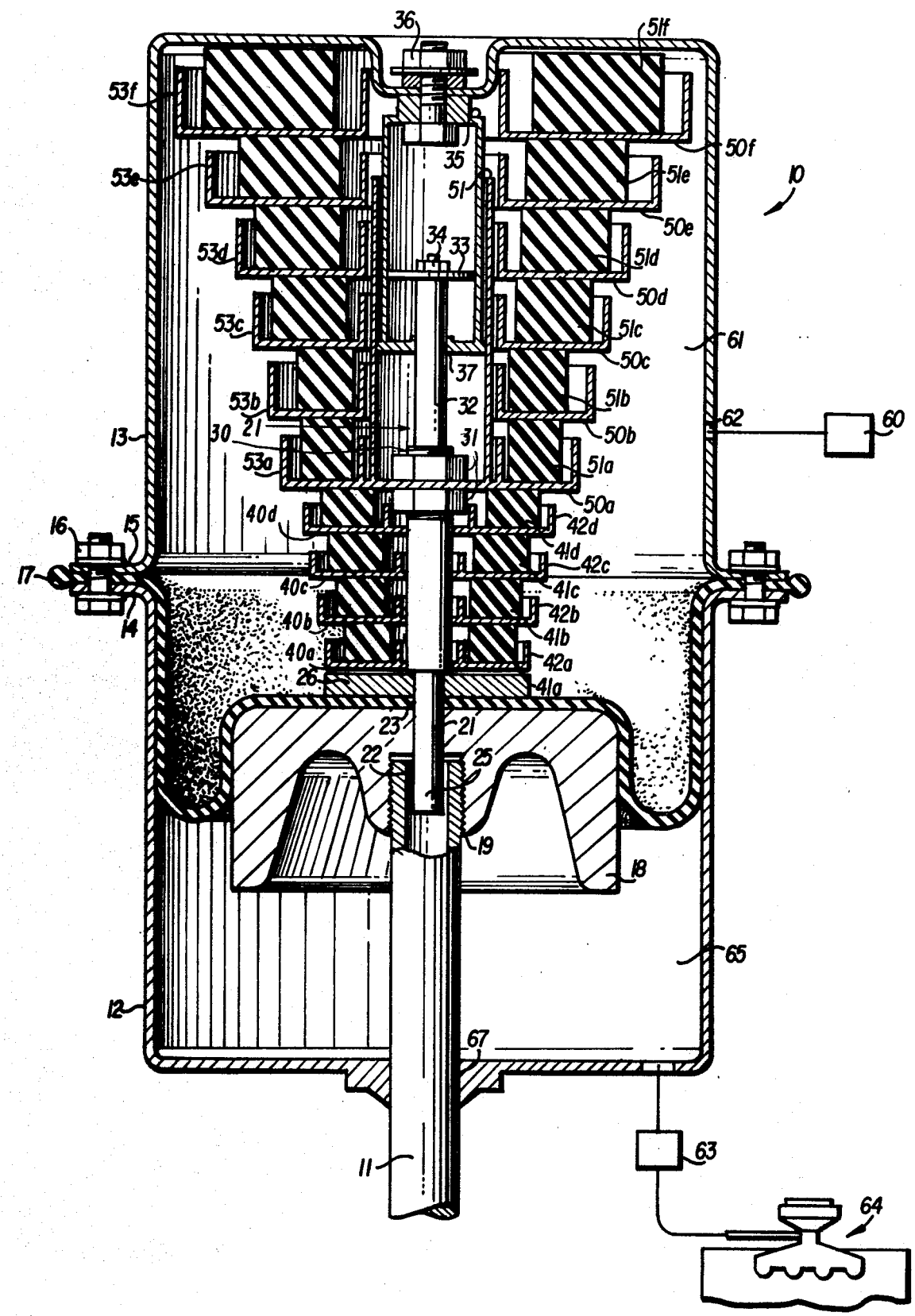

ADJUSTABLE SUSPENSION ASSEMBLY

BACKGROUND OF THE INVENTION

Vehicular suspension systems usually employ some type of compression spring assembly for cushioning shocks during operation of the vehicle. Because compression springs generally exhibit a constant rate of compression or constant spring rate, they may be incapable of fully absorbing rapidly changing shock loads. As a result, an undesirable shock level may be transmitted through the suspension system to the frame of the vehicle.

Also, many vehicles such as pick-up trucks, vans, campers, school buses, and the like are operated as dualpurpose vehicles. Sometimes they carry only a driver and possibly a passenger or two; at other times they will be fully loaded and need proper overload spring capacity. The fully-loaded spring capacity is obviously more than the desirable amount for the minimum load condition.

In an effort to provide a more satisfactory cushioning response, a plurality of compression spring assemblies, each exhibiting a different spring rate, have been positioned to jointly cushion loads. While this type of system may provide a cushioning response to a greater variety of shocks, it will remain limited in performance as long as the individual springs are capable of only providing a constant rate of compression.

As a further improvement, known suspension systems have attempted to modify one of the spring assemblies to provide a variable spring rate capable of more fully cushioning changing shock loads.

One of the more desirable systems to cope with this problem is that which uses automatically-variable pressure bags. These air bags operate over a wide pressure range, but their satisfactory operation depends on a suitable air source that must be replenished constantly as the vehicle is driven because the automatic leveling valves constantly function in attempting to maintain the pre-set level height of the vehicle by letting air in and out as the suspension system moves up and down in response to the irregular road surface. They also operate at relatively high pressure during maximum load operation; therefore, they sometimes blow out like a tire with age. They can also be cut by a foreign object and blow out. In addition to these possible problems, the leveling valves are subject to maintenance at various intervals or the air bag may over inflate or under inflate and go flat. Either case may render the vehicle inoperative.

An additional problem encountered with the use of the air bag only, is the mismatch of the vehicle shock absorber. For example, when the vehicle is lightly loaded, a relatively light shock absorber is desirable in order to enjoy the benefits of the soft air cushion provided by the low pressure in the air bag. A light or relatively moderate shock absorber will provide a comfortable, smooth ride when light loads are carried, but cannot control the ride or rebound of the springs when the heavy loads are carried with high pressure in the air bags. With an air bag suspension system operating in a conventional manner, the shock absorber can only be chosen for one of the conditions and will be compromised for the other. This can result in a very unsatisfactory operational condition somewhere in the load range of the vehicle.

A preferred embodiment of applicant's invention overcomes the problems of the known devices of a similar type, while still providing the known benefits of using an air-bag assembly.

In accordance with the preferred embodiment of the present invention, a novel suspension system comprises an air-bag assembly acting in cooperation with a spring assembly comprising a plurality of sequentially deformable elastomeric members. The air-bag assembly may, in one embodiment, be pre-inflated to a desired level and function to absorb a portion of the shock load with the balance of the load being borne by the elastomeric members as they are sequentially deformed. Because the elastomeric members are sequentially deformable, they exhibit a variable spring rate which functions to absorb the remaining portion of the shock load which would have been transmitted through the air-bag assembly.

Applicant's preferred embodiment dispenses with the complex high-pressure valve apparatus necessary for varying the air pressure within the air-bag assembly. Rather, compressed air at a lower pressure may be selectively supplied from a conventional source, such as an air pump, which may be removably attached to an intake nozzle extending from the air-bag assembly.

Conveniently, a further embodiment of applicant's invention may provide an air-bag assembly which functions, in cooperation with some of the elastomeric members which are initially deformed by a given load, as a primary cushioning system, and with others of the elastomeric members which only become deformed by a heavy load providing a secondary spring reacting to and cushioning intense shock loads. An advantage of this embodiment resides in the fact that the elastomeric members are initially undeformed, or only relatively slightly deformed, by the weight of the vehicle, thereby avoiding a permanent set from occurring in the elastomeric material. Furthermore, an accurate tuning of the suspension system force curve can be readily accomplished by substituting elastomeric members of differing sizes, or changing the number of elastomeric members within the assembly, or both.

Some of the elastomeric members are intended to be compressed only during an overload condition. A light load or soft-ride condition may be provided by a conventional, externally-mounted soft-ride shock absorber positioned between the frame and axle assembly of the vehicle and acting in cooperation with the more easily deformable elastomeric members to give a soft, smooth ride when the vehicle is lightly loaded. Preferably, a further shock absorber is incorporated within the device of the invention and has stiffer characteristics and acts to provide the desired ride control in cooperation with those elastomeric members which are compressed only in response to heavy loads, such as occurs when the vehicle is heavily loaded or encounters greater-than-normal compression from extreme driving conditions.

The combination of applicant's novel suspension system and a conventional shock absorber allows both a soft-ride range and a firm-ride range to be easily tailored to suit a particular vehicle's requirements. Furthermore, the soft-ride, externally mounted shock absorber cushions a majority of the light shocks encountered and is easily replaced at minimal cost, whereas the novel suspension assembly comprising the preferred embodiment receives considerably less wear and hence need not be replaced as frequently. This results in a savings on maintenance cost over a long period of usage.

A significant benefit of the preferred embodiment resides in the ability to manufacture a commercial vehicle, such as a school but with weight-saving materials and techniques that would otherwise be short-lived if the extremely hard conventional truck springs were used in the suspension system. The rough ride of conventional truck-type springs has proven, more than any other factor, to be responsible for the need to frequently replace school buses that are literally shaken to destruction before the running gear is ready for retirement. Even though conventional air-ride systems are used on city buses, they often require frequent maintenance due to their elaborate construction. In comparison, the preferred embodiment provides the desirable soft ride with the low maintenance of conventional spring assemblies.

In a further embodiment of applicant's invention, an air-bag assembly may be partially vacuumized through a passageway joining a source of sub-atmospheric pressure, such as the vehicles's engine manifold, with the partial vacuum within the air-bag assembly functioning to resist and cushion shock loads. As in the previous embodiments, it would be within the scope of the present invention to partially vacuumize the air-bag to a desired level, with the air-bag and sequentially deformable elastomeric members jointly cushioning the shock loads.

Conveniently, a further embodiment of the present invention may employ only a plurality of sequentially actuable elastomeric members to provide a spring assembly exhibiting a varying spring rate in compression. Such an assembly should not be limited to use in a suspension system, but may be adaptable for use wherever a variable rate spring assembly is employed. Thus, the present invention provides a variable rate overload capacity spring that provides a smooth ride at low vehicle weights but also provides adequately damped rebound control at the heavy weights.

The suspension system of this invention does not operate at extreme high pressure as with the prior art air-bag because the overload is carried substantially entirely by the elastomeric members, not high pressure air. Thus, the air-bags are considerably less likely to have a blow-out with age. The low pressure bag is also less likely to be damaged by a foreign object. Also, the system of this invention does not need an expensive air system to replenish the air while driving. If it is desired to provide the system with a level-ride feature, this can be controlled by low pressure vacuum off the engine which is always available if the vehicle is capable of running.

A further advantage is that the normal function produced by the expansion and contraction of the elastomeric members produces a natural rebound restraint. Therefore, a wide selection of materials may be used to produce varied amounts of natural rebound control, making it possible to provide a low cost unit for many applications where the precise control of an automobile is not necessary.

OBJECTS AND SUMMARY OF THE PRESENT INVENTION

An object of the present invention is to provide an adjustable vehicle suspension system which may be easily tuned to provide a particular force curve through the substitution of elastomeric members.

A further object of the present invention is to provide an adjustable suspension system incorporating an air-bag spring assembly and an elastomeric spring assembly cooperating to cushion shock loads.

A further object of the present invention is to provide an adjustable suspension system wherein the elastomeric spring assembly comprises a plurality of disk-shaped members positioned for sequential deformation in response to shock loads.

Another object of the present invention is to provide a suspension system wherein the spring rate of the airbag spring assembly can be easily varied to compensate for changing load conditions without the use of a complex control valve assembly.

A preferred embodiment of the present invention achieves the aforestated objects by providing a cooperative suspension system incorporating a primary air-bag spring assembly and a secondary, elastomeric spring assembly. The pressurized air-bag assembly comprises a container adaptable for holding varying amounts of a gas, such as air, with the pressurized air functioning to absorb the majority of vehicle shocks. A nozzle may be attached to the container for easily adjusting the air level by attachment with a conventional air source, such as an air pump.

A plurality of stacked, elastomeric members provide a jointly acting shock absorbing assembly. Each of the elastomeric members is positioned within a cup-shaped retaining member, with each elastomeric member successively deforming under a compressive shock load until it abuts the edge of the cup-shaped retaining member. Only those elastomeric members necessary for fully cushioning the shock will be deformed.

A more complete understanding of this invention can be obtained from the following detailed description when read in conjunction with the accompanying drawings wherein similar elements are referred to and indicated by similar reference numerals.

BRIEF DESCRIPTION OF THE DRAWING

The present invention can be best understood with reference to the accompanying drawings, wherein:

The FIGURE shows a cross-sectional view of a vehicle suspension system in accordance with a preferred embodiment of the present invention.

DETAILED DESCRIPTION OF A PREFERRED EMBODIMENT

Referring to the accompanying drawing, a vehicle suspension system 10 is shown in cross-section. Suspension 10 is supported between a strut 11 and a conventional vehicle chassis (not shown). Strut 11 extends from suspension 10 into engagement with a conventional axle support housing (not shown).

As will be explained in greater detail, suspension 10 functions to cushion the vehicle chassis against shocks encountered during the operation of the vehicle. Furthermore, suspension 10 can be easily adjusted or "tuned" for a wide variety of anticipated driving conditions without costly or complex adjustment apparatus.

Suspension 10 comprises first and second cylindrically shaped assemblies designated 12 and 13, respectively. Each cylindrical assembly is open at one end and includes a radially, outwardly directed flange portion 14 and 15, respectively, which are fixedly attached to one another by a plurality of conventional nut and bolt assemblies 16. A flexible diaphragm 17 completely blocks the confronting open end portions of assemblies 12 and 13, with an outer surface of diaphragm 17 also being fixed between flanges 14 and 15 by bolts 16. It is within the scope of the present invention to form assemblies 12 and 13 as flexible bellows members.

A generally circularly shaped, support platform 18 is positioned within assembly 12 and includes a blind, threaded bore 19 adaptable for receiving a threaded end of strut 11. Platform 18 further includes a flat surface 20 abutting and supporting a central portion of circular diaphragm 17.

A main support shaft 24 includes portions extending within assemblies 12 and 13. Support shaft 24 further includes an end portion 25 extending through an aperture 23 in diaphragm 17, an aperture 21 in platform 18 and partially into an elongated bore 22 formed in an end of strut 11, whereby strut 11 is capable of reciprocating movement relative to shaft 24.

Shaft 24 includes an outwardly threaded surface portion 30 spaced from end portion 25. A pair of nuts 31 threadably engage threaded portion 30 and are positioned on opposite sides of plate 50a for reasons which will be made presently clear. Shaft 24 further includes a second end portion 32 extending from threaded portion 30 and formed with a lesser diameter. A circular end plate 33 is attached to a threaded end surface of portion 32 of shaft 24 by a nut 34.

A cylindrically shaped, tubular member 35 is positioned within assembly 13 and is attached to an end wall thereof, by a conventional nut and bolt assembly 36. Tubular member 35 encloses end plate 33, with an aperture 37 in member 35 providing a fluid-tight seal about end portion 32 of shaft 24. When an appropriate hydraulic fluid, such as oil, is positioned within a tube formed by member 35 and plate 33, the reciprocal action of plate 33 functions as a hydraulic shock absorber to partially cushion reciprocal motion of shaft 24.

A first plurality of circular support plates 40a-d are each formed with a central aperture extending therethrough, allowing the plates 40a-d to be stacked on shaft 24 as shown in the FIGURE. Plate 40a is supported on a support disk 26 positioned adjacent diaphragm 17, with plate 40a including a ring shaped member 41a positioned thereon. Ring member 41a may be formed from an elastomeric material, such as polyurethane and may be generally rectangular in cross-section.

Each of the stacked plates 40a-d is formed with a radial outer diameter which is greater than the radial outer diameter of the plate positioned therebeneath. Likewise, each plate 40b-d also supports a separate ring-shaped, elastomeric member 41b-d which is of a greater radial outer diameter than the radial outer diameter of an adjacent ring positioned closer to diaphragm 17.

Elastomeric ring 41a directly supports plate 40b while ring 41b supports plate 40c and ring 41c supports plate 40d. Each plate 40a-d also includes a circular flange assembly 42a-d comprising a pair of circumferentially shaped flanges attached to radial inner and outer edge surfaces of plates 40a-d and extending in a direction away from disk 26. Elastomeric rings 41a-d are formed with a space initially existing between each ring 41 and its adjacent flanges 42a-d when the rings 41a-d are in unstressed condition. The reason for this spacing will become evident during the explanation of the operation of the present invention.

A second plurality of circular plates 50a-f each includes a central aperture of a size sufficient to allow tubular member 35 to extend therethrough, as shown in the drawing. Each of the stacked plates 50a-f increases in diameter radially as compared to an adjacent plate positioned closer to disk 26. Plate 50a is supported between nuts 31 and is positioned adjacent to a surface of ring 41d.

A cylindrically shaped, guide tube 51 is attached to plate 50a, and slidingly abuts an outer surface portion of member 35 while acting as a guide for several of the plates 50b-f. A ring-shaped, elastomeric member 51a is supported on plate 50a, with ring 51a directly supporting plate 50b. In a like manner, a plurality of ring-shaped, elastomeric members 51b-f are each positioned on a respective plate 50b-f, with each ring member directly supporting the next plate stacked vertically thereabove. Each elastomeric member 51a-f increases in diameter radially as compared to the particular resilient member positioned therebeneath.

A flange assembly 53a-f comprises a pair of circumferentially shaped flanges attached to radial inner and outer edge surfaces of plates 50a-f, with flange assemblies 53a-f extending away from disk 26.

A conventional fluid nozzle and associated tubing is schematically shown at 60 and communicates with a closed chamber 61 formed by assembly 13 and diaphragm 17, through an aperture 62. In a like manner, a control mechanism schematically shown at 63 may be attached to a partial vacuum source, such as an engine manifold 64, and communicates with a closed chamber 65 formed by assembly 12 and diaphragm 17, through an aperture 66. Finally, it is noted that assembly 12 makes a fluid-tight, slidable seal 67 about strut 11.

The operation of the preferred embodiment of the present invention will now be explained with attention being directed to the attached drawing.

Pressurized gas, such as air, may be selectively injected into chamber 61 through fluid valve 60 and aperture 61. When the pressure within chamber 61 reaches a preselected level, valve 60 is closed and chamber 61 functions as a sealed, gas spring assembly to cushion shocks transmitted to the vehicle chassis. Because any amount of air functions to partially cushion shocks, sealed chamber 61 will operate even when the air is at atmospheric pressure.

Cooperating with the pressuirzed air in the secondary spring system formed by the elastomeric members 41a-d and 51a-f, respectively, which aid the air spring created within chamber 61 in cushioning compressive shocks. As strut 11 is compressed under load, it reciprocates within chamber 12 and forces platform 18, disk 26 and plate 40a to move toward plate 40b. Elastomeric member 41a is compressed and begins to deform. Only after member 41a has deformed to fully occupy the space between plates 41a, 41b and flanges 42a, will the compressive force of strut 11 be transmitted to elastomeric member 41b. In a like manner, each elastomeric member 41b-d and 51a-f is successively deformed, with the sequential deforming process acting to absorb the compressive load from strut 11.

Elastomeric members 41a-d may be considered as a "soft" ride pack, in that these members are the first to deform under low level shocks. Elastomeric rings 41a-d cooperate with a conventional, exteriorly mounted shock absorber to absorb the low level shocks to provide a smooth ride. Similarly, elastomeric members 51a-f may be considered as a "heavy" ride pack which cushions high level shocks. Elastomeric elements 51a-f will only deform after elements 41a-d have been fully compressed. This allows for a two stage cushioning effect which is capable of providing a much more sensitive shock absorbing assembly. Additionally, because shaft 24 is attached for movement with plate 51a via nuts 31, shock absorber 35 will function in conjunction with elastomeric members 51a-f to cushion the high level shocks.

The overall shock absorbing capacity of the elastomeric spring assembly may be easily adjusted by adding, deleting or changing the thickness or diameter of any number of the elastomeric members. Likewise, the elastomeric members may be formed with differing degrees of resiliency as measured on the durometric scale. Finally, the elastomeric characteristics may be changed by varying the initial spacing between the elastomeric rings and the flanges attached to inner and outer edges of the supporting plates.

The number of elastomeric members used in the spring assembly should not be limited to the number shown in the drawing, but may include any number of elastomeric members required to provide a satisfactory ride within the vehicle.

The spring achieved by pressurizing chamber 61 may conveniently carry the majority of the shock load, with the secondary, elastomeric ring providing additional cushioning, while allowing for accurate tuning of suspension 10 to specific operating conditions. Because of the secondary role of the elastomeric members, they avoid being initially stressed by the weight of the vehicle. This construction greatly reduces the possibility of initial deformation of the elastomeric members leading to an undesirable permanent set.

Control system mechanism 63 may be manually actuated or automatically actuated by a load sensor to open a passage between the vehicle's engine manifold 64 and the closed chamber 65 to create a partial vacuum within chamber 65. Diaphragm 17 positioned between relatively pressurized chamber 61 and partially vacuumized chamber 65, will move toward chamber 65 to adjust the spring effect of chamber 61. Because diaphragm 17 responds to a difference in pressure, any pressure within chamber 61 is operational when compared to the partial vacuum created within chamber 65.

In a further preferred embodiment, the air-bag assembly of the present invention may be operated independently of control mechanism 63, by manually adjusting the gas pressure in chamber 61 through nozzle assembly 60. This allows each of the air-bag assemblies to be selectively set to provide a predetermined spring rate.

Conveniently, the novel elastomeric spring assembly of the present invention can be used either by itself to absorb compressive loads or in cooperation with a conventional spring assembly exhibiting a constant spring rate. In either case, the sequentially actuable elastomeric assembly provides a response which varies with the changing compressive load.

What I claim is:

1. An assembly for progressively cushioning the transmission of shock forces between first and second relatively movable, spaced members, and comprising:
    a first support assembly mounted on said first member and a second support assembly mounted on said second member;
    a stack of separate elastomeric members arranged between said first and second support assemblies, with individual elastomeric members increasing in size between opposite ends of said stack of elastomeric members;
    retaining means for sequentially deforming said individual elastomeric members a predetermined amount in response to relative movement of said first and second support assemblies toward one another to progressively cushion the transmission of shock forces between said first and second spaced members;
    said retaining means comprising a plurality of separate cup-shaped retaining members each positioned between a pair of adjacently disposed elastomeric members with each retaining member including an end portion surrounding and initially spaced from an edge surface of one of said respective elastomeric members, with said end portion extending at a substantially perpendicular angle to a remaining portion of said retaining member;
    whereby each respective retaining member deforms an elastomeric member into abutting contact with the end portion of said respective retaining member to cushion a compressive force prior to transmission of said compressive force to an adjacently disposed retaining member.

2. An assembly according to claim 1, wherein each elastomeric member is substantially disk-shaped and includes an aperture extending transversely therethrough,
    and each retaining member includes a substantially plate-shaped central portion surrounded by a first upturned flange forming an end portion extending circumferentially about an outer edge of said plate-shaped central portion.

3. an assembly according to claim 2, wherein each plate-shaped central portion includes an aperture extending transversely therethrough, with a second upturned flange forming an end portion extending circumferentially about an inner edge of said plate-shaped central portion, with said first and second upturned flanges extending substantially parallel to one another to limit deformation of an elastomeric disk positioned therebetween.

4. An assembly according to claim 2, wherein each of said disk-shaped elastomeric members varies in size as compared to an adjacently disposed elastomeric disk positioned on a first side thereof.

5. An assembly according to claim 4, wherein each elastomeric disk and its respective retaining member increase in size as compared to an adjacently disposed elastomeric disk and its cup-shaped retaining member positioned on said first side thereof.

6. An assembly according to claim 1, wherein said first support assembly comprises a hollow container including opposite end portions, with one end portion being open and the remaining end portion being closed.

7. An assembly according to claim 6, wherein said second support assembly comprises a strut connected to the second member and slidably extending into said open end portion of said hollow container.

8. An assembly according to claim 7, wherein further means is attached to said hollow container for selectively introducing a pressurized gas into said container for cushioning relative movement of said strut and said container.

9. An assembly according to claim 8, wherein said further means comprises a nozzle assembly forming a fluid passage through a wall of said container.

10. An assembly according to claim 1, wherein each of said elastomeric members is disk-shaped, with at least two of the disks being constructed of elastomeric material of varying hardness.

11. An adjustable suspension system for progressively cushioning shocks, and comprising:

a first hollow support assembly having a partition extending therethrough, said partition dividing said hollow assembly into first and second chambers;

a second support assembly extending through one of said chambers and connecting with said partition;

a plurality of separate elastomeric members stacked one on top of another within said remaining chamber with said elastomeric members increasing in size between opposite ends of said stack;

retaining means for sequentially deforming each elastomeric member to progressively cushion the relative movement of said first and second support assemblies toward one another;

said retaining means comprising a plurality of separate cup-shaped retaining members each positioned between a pair of adjacently disposed elastomeric members with each retaining member including an end portion surrounding and initially spaced from an edge surface of one of said respective elastomeric members;

whereby each respective retaining member deforms an elastomeric member into abutting contact with the end portion of said respective retaining member to cushion a compressive force prior to transmission of said compressive force to an adjacently disposed retaining member; and further means for selectively introducing a pressurized gas into at least one of said chambers to further cushion relative movement of said support assemblies toward one another.

12. An assembly according to claim 11, wherein said first hollow support assembly comprises a pair of cylindrically shaped sections, each section being closed at one end, and each section including a flange portion attached to an open end of said respective section, said flange portions being fastened to join said sections together.

13. An assembly according to claim 12, wherein said partition comprises a flexible diaphragm member fixedly attached between said adjacent flanges of said first and second sections.

14. An assembly according to claim 13, wherein each of said elastomeric members comprises a separate, disk-shaped member including an aperture extending through a central portion.

15. An assembly according to claim 14, wherein each elastomeric disk is stacked on top of one another and increases in width as compared to an adjacent disk more closely positioned to said diaphragm.

16. An assembly according to claim 14, wherein each elastomeric disk increases in diameter as compared to an adjacent disk more closely positioned to said diaphragm.

17. An assembly according to claim 14, wherein a support shaft extends from said second support assembly, through the central apertures formed in a plurality of said elastomeric disks, said support shaft being fixedly attached to a centrally positioned cup-shaped retainer, and said support shaft having a circumferentially extending portion attached at an end thereof.

18. An assembly according to claim 17, wherein a hollow container including hydraulic fluid is attached to a wall portion of said first hollow support assembly and slidably encloses the circumferential portion of said support shaft to form a hydraulic fluid shock absorber between said first and second support assemblies.

19. An assembly according to claim 14, wherein said second support assembly comprises a strut connected to an axle portion of the vehicle and extending through an aperture formed in a chamber of said first hollow support assembly.

20. An assembly according to claim 19, wherein said second support assembly further includes a pair of support plates abutting both sides of said diaphragm, with a fastener extending through aligned apertures in said support plates and diaphragm securing said diaphragm for movement with said support plates.

21. An assembly according to claim 11, wherein said sequentially deforming means comprises a plurality of disk shaped retaining assemblies, each retaining assembly supporting one of said elastomeric disks and having a central aperture extending therethrough.

22. An assembly according to claim 21, wherein each retaining assembly includes a flange attached to an outer edge and extending away from said diaphragm.

23. An assembly according to claim 21, wherein a plurality of said retaining assemblies each further includes a second flange attached to an edge forming said aperture and extending away from said diaphragm.

24. An assembly according to claim 11, wherein said further means comprises a nozzle assembly in fluid connection with the chamber of said first support member including said elastomeric means.

25. An assembly according to claim 11, wherein said further means selectively introduces a pressurized gas into said chamber to cushion the relative movement of said first and second support assemblies toward one another.

26. An assembly according to claim 25, wherein said pressurized gas cushion provides a primary shock absorbing cushion which acts in cooperation with said elastomeric means to fully cushion changing shock loads.

27. An assembly according to claim 11, wherein said further means comprises a control system for selectively introducing sub-atmospheric pressure from an engine manifold into the chamber of said first support assembly including said second support assembly, whereby sub-atmospheric gas in said chamber cushions the relative movement of said support assemblies toward one another.

28. An assembly according to claim 18 wherein said support shaft moves with said attached cup-shaped retaining member to actuate said fluid shock absorber for partially damping high level shock loads.

* * * * *